United States Patent [19]

Matthews

[11] Patent Number: 5,051,218

[45] Date of Patent: Sep. 24, 1991

[54] METHOD FOR LOCALIZED HEATING AND ISOSTATICALLY PRESSING OF GLASS ENCAPSULATED MATERIALS

[75] Inventor: M. Dean Matthews, Saratoga, Calif.

[73] Assignee: The Regents of the University of California, Oakland, Calif.

[21] Appl. No.: 309,334

[22] Filed: Feb. 10, 1989

[51] Int. Cl.$^5$ .................. B29C 43/10; C04B 36/60
[52] U.S. Cl. ............................ 264/40.6; 264/56; 264/125; 264/332; 264/570; 419/10; 419/49; 419/56
[58] Field of Search .......... 264/40.6, 570, 64, 325, 264/332; 425/78; 419/10, 30, 48, 49, 52, 66, 68; 505/739, 780, 1

[56] References Cited

U.S. PATENT DOCUMENTS

| | | | |
|---|---|---|---|
| 2,648,125 | 8/1953 | McKenna | 29/160.5 |
| 4,041,123 | 8/1977 | Lange et al. | 264/332 |
| 4,227,927 | 10/1980 | Black et al. | 75/225 |
| 4,443,404 | 4/1984 | Tsuda et al. | 419/2 |
| 4,490,139 | 12/1984 | Lee et al. | 264/65 |
| 4,524,138 | 6/1985 | Schwetz et al. | 501/90 |
| 4,594,104 | 6/1986 | Reybould | 419/48 |
| 4,596,694 | 6/1986 | Rozmus | 419/49 |
| 4,632,793 | 12/1986 | Ezis et al. | 264/58 |
| 4,656,002 | 4/1987 | Lizenby et al. | 419/10 |
| 4,657,822 | 4/1987 | Goldstein | 428/522 |
| 4,724,123 | 2/1988 | Rozmus, Jr. | 419/68 |
| 4,732,556 | 3/1988 | Chiang et al. | 425/405.2 |
| 4,738,610 | 4/1988 | Chiang et al. | 425/405.2 |
| 4,744,943 | 5/1988 | Timm | 419/10 |

OTHER PUBLICATIONS

K. H. Rolle, "Powder Metallurgy," *Kirk-Othmer: Encyclopedia of Chemical Technology*, 3rd Ed., vol. 19, pp. 28–62 (1982).

Primary Examiner—Jan H. Silbaugh
Assistant Examiner—Christopher A. Fiorilla
Attorney, Agent, or Firm—Phillips, Moore, Lempio & Finley

[57] ABSTRACT

A method for consolidating or densifying material selected from metal, ceramic or mixtures thereof to form a densified compact article, which process includes (a) arranging the sample to be consolidated or densified in a general configuration within a temperature controlled high pressure chamber completely surrounded by a pre-glass material which forms a glass at elevated temperature in close proximity and surrounded by a heating element within the pre-glass material and having at least one temperature measuring device in close proximity to the sample all located within a shell; (b) externally heating the arrangement produced in step (a) at an elevated temperature for a time effective to remove moisture, volatiles, impurities, volatile oxides or mixtures thereof; (c) heating the sample produced in step (c) to produce fusion of the pre-glass at between about 500° to 1600° C. to encapsulate the heating element; (d) using the encapsulated heating element, to locally heat the prearticle and sample to a temperature of between about 700° and 2,200° C., monitoring the sample temperature using the temperature measuring device, and simultaneously applying a pressure to the prearticle of between about 50,000 and 275,000 psi for a time effective to densify the material, wherein the external pressure chamber has a surface temperature in contact with the prearticle of not greater than 500° C., and recovering the formed article. The brief localized heating makes it possible to use the high pressing pressures.

14 Claims, 4 Drawing Sheets

METHOD FOR LOCALIZED HEATING AND ISOSTATICALLY PRESSING OF GLASS ENCAPSULATED MATERIALS

BACKGROUND OF THE INVENTION

1. Field of the Invention

The present invention relates to a novel method to locally heat and isostatically press glass encapsulated materials at high pressures and at high localized temperatures. More specifically, the present invention relates to a method to compact a glass encapsulated powdered material at very high pressures having a localized heating element in the glass and localized temperature monitoring. In this way, the sample locally is heated, but the metal or ceramic pressure chambers are usually kept at low relative temperature of less than about 500° C.

2. Description of Related Art

Powder technology using heat and pressure to form engineered materials and high performance articles is conventional. General aspects of the art include, for example, "Powder Metallurgy" by K. H. Roll in *Kirk-Othmer: Encyclopedia of Chemical Technology*, 3rd Ed., Vol. 19, pp. 28-62, John Wiley and Sons, New York, N.Y., published in 1982, and the references cited therein. Also see in the Kirk-Othmer volumes (3rd ed.): "High Temperature Alloys," by N. S. Stoloff, et al. (1980), Vol. 12, pp. 417-458; and "High Temperature Composites" by W. B. Hillig (1980), Vol. 12, pp. 459-481.

Superconducting materials are disclosed in "Superconducting Materials," by F. P. Missell, et al. in *Kirk-Othmer: Encyclopedia of Chemical Technology*, 3rd Ed., Vol. 22, pp. 298-331, published in 1983, and "Ceramics" is discussed by R. F. Davis, et al., in *Kirk-Othmer: Encyclopedia of Chemical Technology*, 3rd Ed., Vol. 5, pp. 237-314, published in 1979.

In U.S. Pat. No. 4,428,906, W. J. Rozmus discloses a number of features regarding the formation of an article from a powdered metal using heat and pressure.

Additional U.S. Patents of interest include:

| | | |
|---|---|---|
| 4,756,752 | 4,722,825 | 4,597,730 |
| 4,528,120 | 4,547,337 | U.S. Re 31,355 |
| 4,656,002 | 4,596,694 | 4,227,927 |
| 4,744,943 | 4,738,610 | 4,524,138 |
| 4,732,556 | 4,724,123 | 4,657,822 |
| 4,632,793 | 4,041,123 | 4,490,319 |

Specifically, E. E. Timm in U.S. Pat. No. 4,744,943 discloses a process for preparing dense consolidated bodies. The distinguishing feature of this process is to perform the process and immediately remove most or all of the fluid isostatic shell by pouring the hot assembly onto a screen and separating the fluid for recycle.

All of the references and patents described in this application are incorporated by reference in their entirety.

None of the references cited individually or collectively teach or suggest the present invention. It is therefore desirable to have a method to solidify and encapsulate materials at moderate and very high pressures using localized heating and localized temperature monitoring of the sample to be solidified without the need to heat the die or pressure pistons to temperatures which will deform them over time. The present invention provides such a method, which is less time consuming, less expensive, provides improved control of the process to compact the materials and the use of higher pressures and local temperatures than processes of the art.

SUMMARY OF THE INVENTION

In one aspect, the present invention relates to an improved method for consolidating or densifying material selected from metal, ceramic or mixtures thereof to form a densified compact article, which process comprises:

(a) arranging the sample to be consolidated or densified in a general configuration completely surrounded by a pre-glass material which forms a fluid glass at elevated temperature in close proximity to and surrounded by a heating element which is located within the pre-glass material and also having at least one temperature measuring device in close proximity to the sample to produce an assembly;

(b) externally heating the assembly produced in step (a) at a temperature of between about 200° and 850° C. at a reduced pressure of between about 1 and 0.0001 mm of mercury for a time effective to remove, volatiles such as moisture, impurities, volatile oxides or mixtures thereof, without fusion of the preglass:

(c) heating the assembly produced in step (b) to produce fusion of the pre-glass at between about 500° to 1600° C., encapsulating the sample in the glass and also encapsulating the heating element in the glass to produce an encapsulated prearticle;

(d) placing the encapsulated prearticle produced in step (c) in an external pressure chamber apparatus and heating, using the encapsulated heating element, the prearticle and encapsulated sample to a temperature of between about 700° and 2,200° C., monitoring the sample temperature using at least one temperature measuring device, and simultaneously applying a pressure to the prearticle of between about 50,000 and 275,000 psi for a time effective to densify the material, wherein the external pressure chamber has an internal surface temperature in contact with the prearticle of not greater than 500° C.; and (e) releasing the elevated pressure and decreasing the temperature of the formed densified compact article to a predetermined temperature.

In another aspect, the present invention relates a variation of the method further includes between step (b) and step (c):

step (b¹) the contacting of the assembly of step (b) with a predetermined partial pressure of a gas to produce or to stabilize oxides of the elements and compounds present.

Additional preferred embodiments include a method wherein the article produced is a useful superconducting material.

Additional preferred embodiments include a method wherein in step (d) the pressure is produced using a solid moving piston within a die.

Additional preferred embodiments include a method wherein in step (d) the pressure and some elevated temperature are produced using explosive compaction.

Additional preferred embodiments include a method wherein in step (d) the encapsulated prearticle is at a temperature of between about 500° and 800° C. when it is placed in the external pressure chamber.

Additional preferred embodiments include a method wherein the process includes between steps (c) and (d):

step ($c^1$) the fused prearticle is cooled to an intermediate temperature between ambient and 500° C.

In another aspect, the present invention relates to the encapsulated preformed sample after evacuation of volatiles and fusion of the encapsulating medium.

In another aspect, the present invention relates to the densified sample encapsulated within the medium.

In another aspect, the present invention relates to the article formed at elevated temperature and elevated temperature, preferably by the process as described herein.

DETAILED DESCRIPTION OF THE INVENTION AND PREFERRED EMBODIMENTS

Definitions

As used herein:

"Ceramic" refers to a particulate refractory material. In general, any ceramic material which has refractory characteristics is useful in this invention. Refractory ceramic materials include mixed crystals such as sialons. Examples of typical refractory ceramic materials include refractory oxides, refractory carbides, refractory nitrides, refractory phosphides, refractory silicides, refractory borides, refractory sulfides and mixtures thereof. Examples of preferred refractory ceramic materials include refractory alumina, zirconia, magnesia, mullite, zircon, thoria, beryllia, urania, spinels, perovskites, tungsten carbide, zirconium carbide, boron carbide, hafnium carbide, silicon carbide, niobium boron carbide, aluminum nitride, titanium nitride, zirconium nitride, tantalum nitride, hafnium nitride, niobium nitride, boron nitride, silicon nitride, titanium boride, chromium boride, zirconium boride, tantalum boride, molybdenum boride, tungsten boride, cerium sulfide, molybdenum sulfide, cadmium sulfide, zinc sulfide, titanium sulfide, magnesium sulfide, zirconium sulfide and mixtures thereof. More preferred ceramic materials include $ZrO_2$, $Al_2O_3$, $Si_3N_4$, SiC, mullite, cordierite, spinel, perovskites, ZnO, $BaTiO_3$ and mixtures thereof. An example of a more preferred ceramic material is zirconia, which can be pure or can include other materials such as stabilizers, e.g., $Y_2O_3$, $CeO_2$, MgO, CaO and mixtures thereof. Ceramic materials include ceramic composites such as a composite of silicon carbide whiskers and alumina.

"Fluid" refers to a medium which is generally a solid at ambient temperature but is an essentially inert noncompressible liquid at elevated temperature, e.g. between about 100° C. and 3000° C., preferably between about 300° and 3500° C., more preferably between about 500° and 2500° C. Typical fluids which act as pressure-transmitting media include for, for example, metals, salts, glasses, oil greases or mixtures thereof. Glasses are preferred with the usual requirement that the glass viscosity at the densification temperature is sufficiently high that the glass does not significantly penetrate the article during densification.

"Metal" or "metallic materials" refers to materials which can be employed alone or with the ceramic material in this invention include metals, metalloids, alloys and mixtures thereof. Examples of typical metallic materials include cobalt, nickel, iron, tungsten, rhenium, steel, stainless steel, superalloys, molybdenum, tantaium, titanium, chromium, niobium, boron, zirconium, vanadium, palladium, hafnium, aluminum, copper, alloys thereof and mixtures thereof. Preferred metallic materials include cobalt, nickel, titanium, chromium, niobium, boron, palladium, hafnium, tantalum, molybdenum, zirconium, vanadium, aluminum, copper, alloys thereof and mixtures thereof. Examples of additional preferred materials which can be employed include magnesium, $Ti_3Al$, $Ni_3Al$, silicon, beryllium, germanium and mixtures and alloys of these. More preferred metallic materials include cobalt, chromium, nickel, titanium, niobium, palladium, hafnium, tantalum, aluminum, copper and mixtures thereof. Still more preferred metallic materials include cobalt, niobium, titanium and mixtures thereof. The most preferred metallic materials include molybdenum, tungsten, tantalum, rhenium, niobium, vanadium, chromium, cobalt and mixtures and alloys of these with each other and other elements and compounds.

"Glass" refers to any material which is generally solid at ambient temperature but becomes an essentially incompressible nonreactive fluid at elevated temperature, e.g. between about 100° to 3500° C. Glass includes, for example, ordinary glass and special glasses having acceptable melt viscosities useful at 600° C. to 1400° C. and beyond to 3000° C.

"Sample" refers to a powder or powders, or a solidified powder or powders. The sample may already be rigid because of prior processing, however, the sample can be further densified using pressure and/or heat.

"Superconductor" refers to any material, e.g. a ceramic, metal or combination thereof which has superconducting properties for electricity at temperatures of between −273° and 0° C., preferably between about −198° and 0° C. It is recently reported that specific mixtures of oxides have superconducting properties at temperatures of about −198° C. or higher. Suitable materials are reported by R. Dagnai, in *Chemical and Engineering News*, May 11, 1987, pp. 7–16.

The process of the present invention is an improved process for consolidating powders at high temperatures and pressures. All materials capable of being consolidated, or densified, can be employed, and several are known to those skilled in the art. For example, the material to be consolidated can be metal, nonmetal, or mixtures thereof; specific examples of powders include metal, ceramic, or polymer powders, or mixtures thereof, e.g., a cermet. The powder to be consolidated can be pure, substantially pure, or can include other materials such as stabilizers or constituent elements, such as carbon in the case of a refractory carbide. The process of the present invention is especially adapted for use with materials which lead to consolidated bodies that are brittle at the desired, predetermined density. For the purposes of the present invention, "brittle" refers to materials wherein the mathematical difference between the yield strength and the ultimate strength is less than 0.2 percent of the elongation for the material. Ceramic-containing powders are preferred. The ceramic-containing powder (sample) can be purely ceramic, i.e., an inorganic, nonmetallic material, or can be a material including ceramic and metallic or other materials.

When employed with a ceramic material, the metallic material typically is from zero to about 90 volume percent of the ceramic/metal mixture. Preferably, the metallic material is from about 0.5 to about 85 volume percent of the mixture. Most preferably, the material to be consolidated or densified is entirely ceramic.

Examples of preferred polymeric materials include polyethylene, polytetrafluoroethylene and mixtures of these with other polymers or each other.

The densification, or consolidation, process can be any known process which employs the application of mechanically induced pressure to a pressure-transmitting medium, such as glass, which is liquid at consolidation conditions to omnidirectionally consolidate materials. The use of mechanically induced pressure, versus gaseous pressure, is well known in the art. See, e.g., U.S. Pat. Nos. 4,428,906 and 4,389,362. Preferably, the pressure is supplied by a forging press using a moving piston and die.

The pressure transmitting medium in which the preform is encased (encapsulated) is any material or combination of materials which is a liquid or a fluid at the encapsulation and compaction temperatures. Typical media include various glasses and/or salts. Glasses are preferred. Boron-containing or high silica glasses are more preferred. The teachings of U.S. Pat. Nos. 4,446,100; 3,469,976; and 3,455,682 regarding glasses, salts and other pressure-transmitting media in which preforms are imbedded and which are flowable and the encapsulation and compaction conditions are incorporated herein by reference. KG-33, which is a borosilicate glass meeting the requirements for the Type I, Class A glass of the American Society of Testing and Materials E-438. The alkali contact is low and it is made without the elements of calcium, magnesium and zinc groups or the heavy metals, brand glass from Kimble Scientific Products, Vineland, N.J., is most preferred.

The heating element may be of any shape to eventually obtain generally localized heating of the assembly and sample during compaction. The heating element must be completely contained in the fluid medium (at least a thin layer) and the medium must have a minimum of unstable oxides (e.g., $Na_2O$, $K_2O$) which will attack and destroy the heating element at elevated temperatures.

Component Assembly —When the completed shell/media/article assembly is the thermal, chemical or physical condition at which it will be inserted into the press tooling, it is called an isostatic die assembly or, by acronym, an IDA (optionally, a hot IDA). Economically effective use of the process which is the subject of this invention, requires development of equipment which is suited to process a wide range of isostatic die assemblies, each of which is suited to the article(s) to be densified. The preferred IDA for the consolidation of a given article from a given particulate material requires consideration of shell and media requirements, article fixturing requirements, heating method requirements, part recovery requirements, other previously discussed requirements, and use of existing capital equipment. A typical isostatic die assembly in the condition to be encapsulated is illustrated in FIG. 1 (alone) and in FIG. 2 (in die 11).

Predensification Processing—Typically, the IDA is assembled at ambient temperature and is heated to the desired fusion temperature at an optimum rate to produce a hot IDA. Heating can be by conduction, convection, or radiant means, and all combinations thereof as is best for the individual IDA's. All forms of radiant heating are contemplated including infrared, induction, radio frequency, including microwave, and the like. The components of the IDA may be at varying temperatures, and assembled in a sequence best suited to the type of thermal, chemical and physical processing required.

Figure 1:
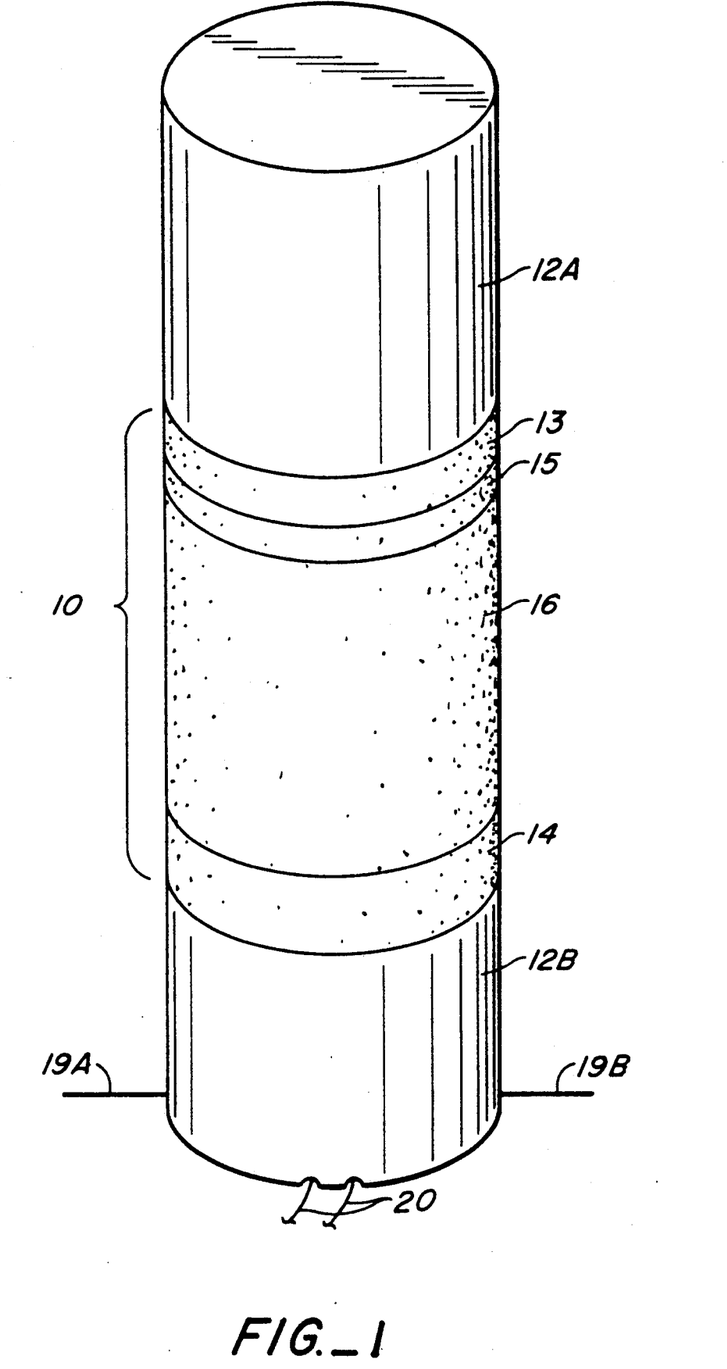
FIG. 1 shows a front isometric view of the sample assembly without the pressure mold or die of the present invention.

In one embodiment, the assembly of FIG. 1 is placed in a separate vacuum furnace. Heat is applied an vacuum to remove water volatiles, etc. The temperature is raised and the glass is then fused and the prearticle is then placed (hot or cold) into die 11 of FIG. 2.

In another embodiment, the components of the IDA are assembled (FIG. 1) and placed in a die 11 (FIG. 2) wherein the IDA is heated in die 11 and placed under vacuum. The volatiles are removed and then the preglass is fused so that glass 22A, 22B and 22C become an integral encapsulating covering.

Control of the chemical environment around the sample during all processing steps is essential. IDA's can be assembled and processed under vacuum or under various gaseous atmospheres, e.g., nitrogen, oxygen and the like. The pressure-transmitting medium can contain "getters," carbon, or other compounds to control the chemical environment around the article as taught in U.S. Pat. No. 3,992,200, the teachings of which are incorporated herein by reference. A preferred embodiment involves the use of glass cylinders and plugs or ground glass as the medium. As the IDA is heated, the glass melts and hermetically seals the articles, heating filament and thermo-couple in the melt, protecting them from the surrounding atmosphere during subsequent processing.

This aspect of the encapsulation is a distinguishing feature of the present invention. The sample, the heating means (filament) and optionally the at least one thermocouple are encapsulated in the fluid (glass). In this way, at the higher temperatures generated by the filament, it does not fail because it is not attacked by atmosphere or the unstable oxides of sodium or potassium. Lithium oxide or calcium oxide, to the exclusion of sodium oxide or potassium oxide, are stable oxides which are used to modify and stabilize the properties of the glass at high temperatures. The fluid (glass) media composition is chosen such that the content of unstable oxides is at a low level such that the filament does not undergo undue attack. $Al_2O_3$, $MgO$, $Li_2O$, and/or $CaO$ are preferred to $Na_2O$ and/or $K_2O$. For example, the upper limit total for $K_2O$ and/or $Na_2O$ in the glass is up to about 5% by weight.

For a tungsten heating filament, in contact with a glass containing $Na_2O$ or $K_2O$, of about 3% by weight (total), a temperature of about 2000° C. or higher for between about 5 to 10 minutes is sufficient for degradation of the tungsten filament.

The IDA may need physical processing prior to densification. Holes may be plugged, insulators added, sensors removed, etc., before the IDA is ready for the densification step.

Figure 2:
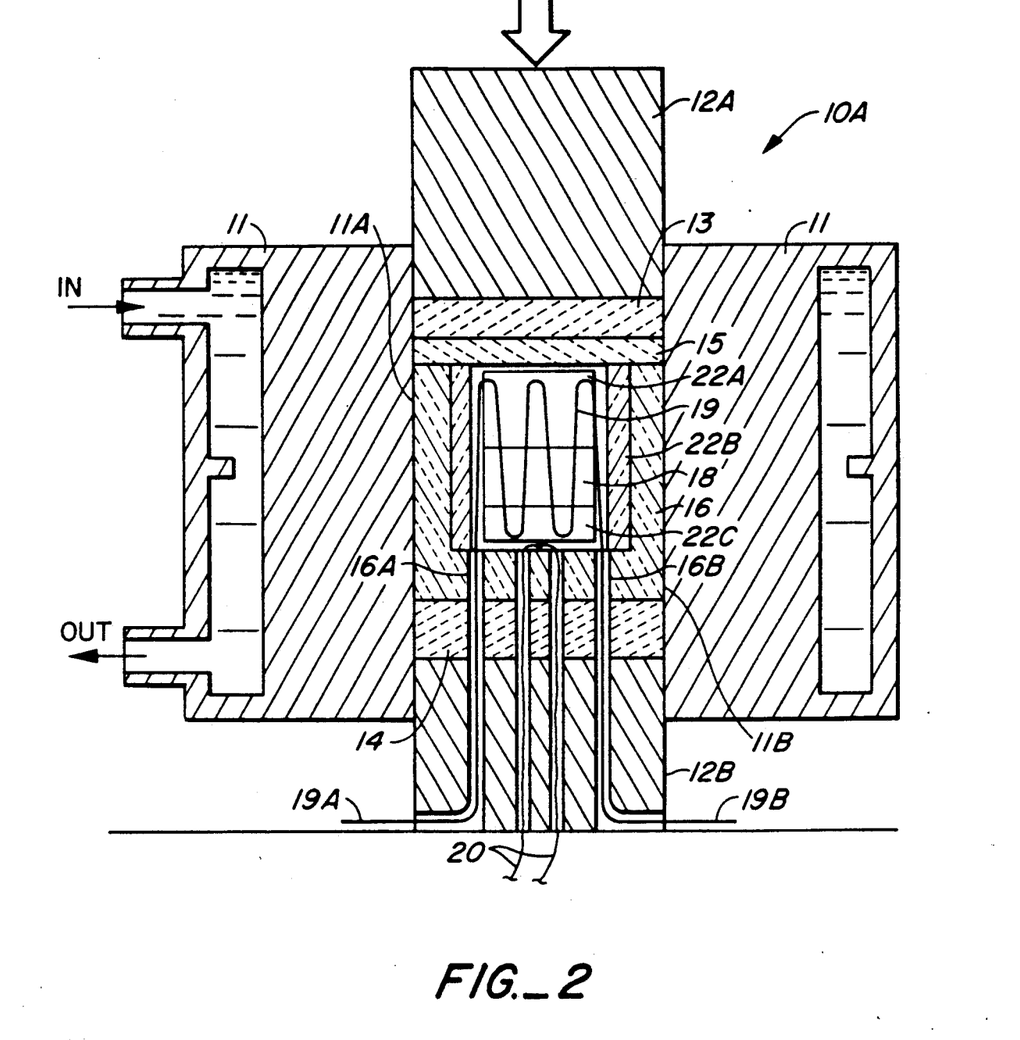
FIG. 2 shows a front diagrammatic cross-sectional view of the apparatus just before pressing and heating of the assembly for encapsulating and also for densification.

Densification—Densification of the article(s) contained in the hot isostatic die assembly is effected by compressing the assembly with a ram in a closed cavity. FIG. 2 illustrates an IDA in a forging press. Typically, hydraulic forging press is equipped with die type tooling, as is shown in FIG. 2, is used for densification. As the ram piston 12A compresses the IDA in the cavity, the integral fluid media 22A, 22B and 22C exerts a large hydrostatic (isostatic) pressure on the articles to densify them. The piston/die interfaces are a close fit, generally of the order of less than about 0.010, preferably less than about 0.008 of an inch. The shell material of the IDA crushes. Pressures as great as 500,000 psi ($3.45 \times 10^3$ MPa) can be generated by the ram and must be applied and released at controlled rates. Die piston interface lubricants such as graphite, boron nitride, or metal based anti-seize compounds can be employed to prevent tooling damage. Molybdenum disulfide is often used as a high temperature lubricant between the piston and die. After densification, the IDA is ejected from the pot die for subsequent processing.

IDA Disassembly—Disassembly of the isostatic die assembly (IDA) without damaging the enclosed, densified articles is a crucial step in any encapsulated type densification process of economic interest.

The present invention involves separation of the three components of the isostatic die assembly by removing the medium away from the articles and shell. In one embodiment, a hot IDA is ejected from the press after densification and is inverted over a pan and screen in furnace so that the medium drains into the pan through the screen, i.e, the dense articles, thermocouple and filament are retained on the screen. This is a simple and economically advantageous means of recovering the dense articles for subsequent processing. This method also recovers the medium for reuse at a temperature which is economically advantageous. Draining can be aided, e.g., by pressure or centrifugal force. The shell of the IDA can be punctured or otherwise breached so that it can drain without inversion if necessary. The separated article can be moved to another area to subsequently cool at a rate so that it is not affected by thermal shock. The separated shell can be discarded or reprocessed for reuse. Glasses that are soluble in either acid or alkaline solution can also be used for ease of removal, i.e., the fused glass covering is dissolved away.

With proper construction, the heating filament and the temperature monitoring device will survive the pressure and temperature of compaction. Therefore, the temperature and rate of cooling can then be controlled using the intact heating filament and monitored using the thermocouple. Cooling rates of between about 5° C. to 200° C. per minute can be achieved. The IDA may also quickly be transferred to a separate furnace to be slowly cooled to obtain particular properties.

The compaction (or densification or consolidation) process can be performed by any known process which employs the application of mechanically induced pressure to pressure-transmitting medium, such as glass which is liquid at consolidation conditions to omnidirectionally consolidate materials. The use of mechanically induced pressure, versus gaseous pressure, is well known in the art. See, for example, U.S. Pat. Nos. 4,428,906 and 4,389,362. Preferably, the pressure on the system is supplied by a forging press.

Explosive compaction of solids, which is conventional in the art, is also a method to obtain the necessary high pressure and localized high temperature for a short time period in the present process.

Final Processing—The final processing of a densified assembly is generally known in the art. After removal of the encapsulating medium, the heating element and the temperature monitor means, the densified article is usually coated with a thin film of the medium. The film is usually removed after cooling. Usually the film is removed by: (1) sandblasting; (2) thermal shock during cooling; or (3) chemical agent attack. The densified article can then be physically machined, etc. for its ultimate use.

The present invention is an improved process for isostatic pressing of metal and ceramic (refractory and superconducting) powders using in situ localized heating and vacuum encapsulation. The method is amenable to both large scale low cost manufacturing and precise small scale research applications.

Figure 3:
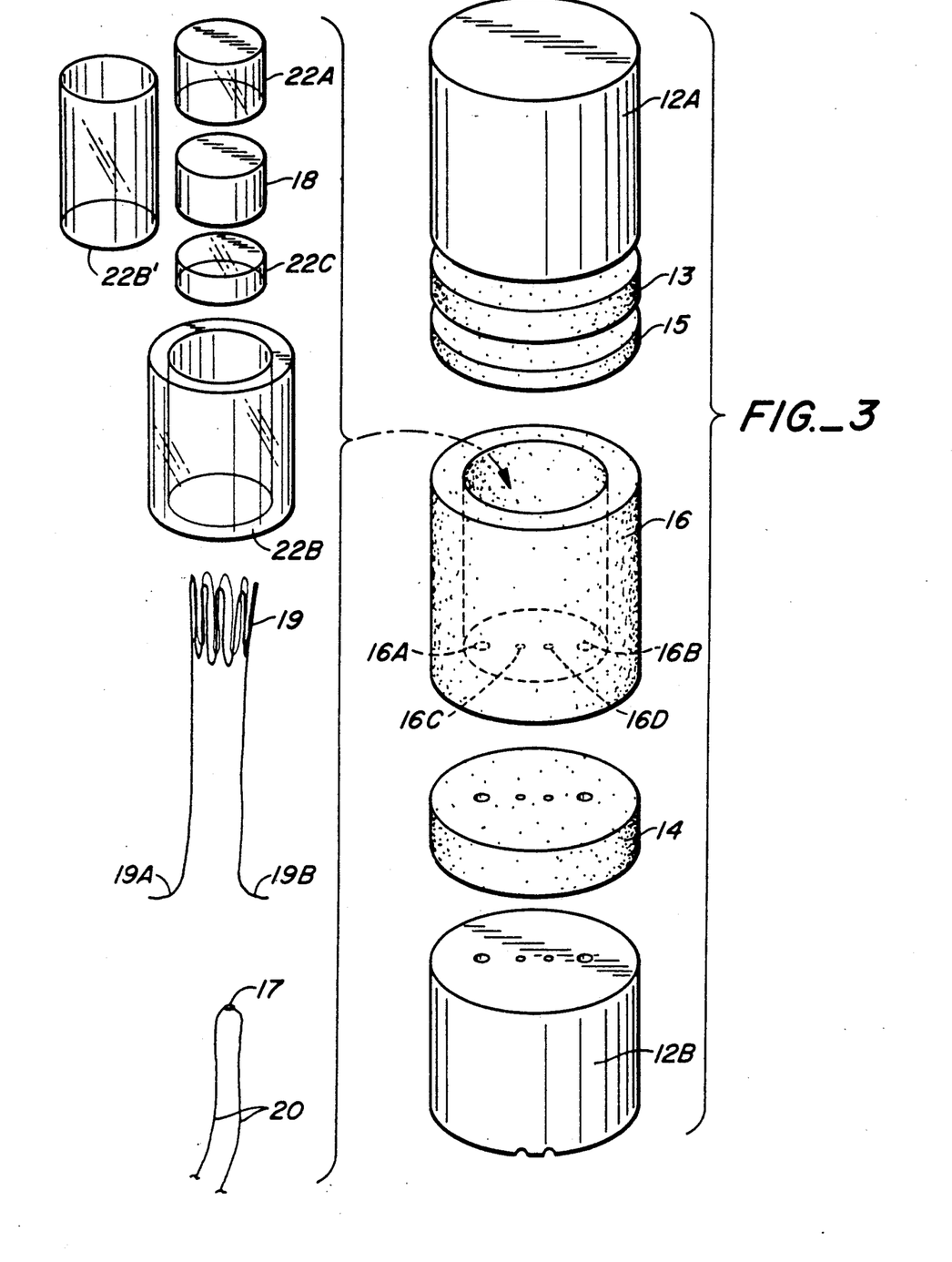
FIG. 3 shows an exploded view of the separate components of the assembly prior to initial heating to fuse the glass.
Figure 4:
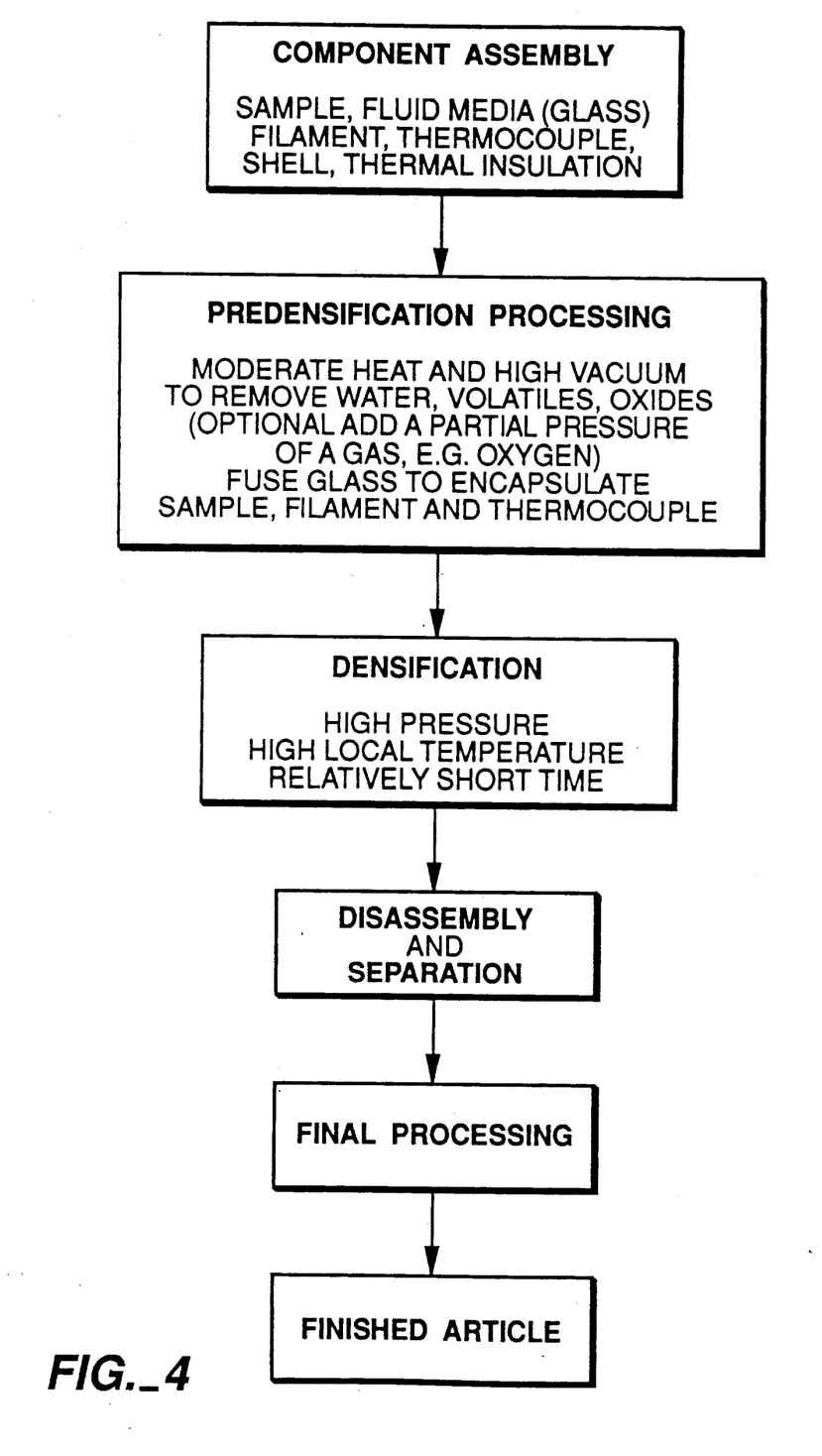
FIG. 4 is a block diagram of an embodiment of the process of the present invention.

Referring specifically now to FIGS. 1, 2 and 3, assembly 10 shows a tungsten filament 19 of specific geometry is placed around the sample to be pressed 18 inside glass preforms 22A, 22B and 22C that surround both filament 19 and sample 18. In addition, an appropriate thermocouple 17 is also enclosed with a junction in close proximity to sample 18. This collection (assembly) of parts, is placed within a cylindrical crucible shell 16 (e.g., zirconia or alumina fibers with low density), low compressive strength and low thermal conductivity. The at least one thermocouple 17, leads 20 and filament leads 19A and 19B are passed through holes 16A, 16B, 16C and 16D in the bottom of the crucible 16.

The entire assembly 10 is heated under vacuum to outgas sample 18 and to fuse the encapsulating glass 22A, 22B and 22C. In some cases a base 14 of insulating ceramic (e.g., pyrophyllite) is included as part of encapsulation and fuses to the outer bottom surface of the shell 16. This encapsulation permits control of absorbed impurities in the sample 18. After removal from the vacuum system, the assembly (hot or cold) is placed in a cylindrical chamber (a pyrophyllite base 14 may be added at this point) through which electrical connection leads for the filament 19 and thermocouple 17 are provided. A tungsten carbide/cobalt piston 12A and pyrophyllite disc 13 are inserted into the top of the chamber. All parts are a close fit in the bore of the die chamber 11. The filament 19 and the thermocouple 17 are connected to a controller which provides a suitable time/temperature profile. Once at temperature, the assembly is subjected to the desired load through application of force on the tungsten carbide/cobalt pistons, 12A and 12B.

A distinguishing feature of this invention is the use of a tungsten filament 19 and optionally the at least one thermocouple 17 encapsulated in the encapsulating glass and to provide localized heating and monitoring of the heating of the powder sample to be pressed.

The advantages of this approach include:
1. This invention allows precise local temperature control of the sample up to the moment of the application of force and thereafter during cooling.
2. Pressing at higher temperatures is possible since heating is done in situ with the surrounding glass and crucible shell providing excellent insulation.
3. Pressing at higher pressures is enabled since an essentially incompressible fluid (glass) is used to provide isostatic pressure, and the localized heating allows the pressure chamber to remain relatively cool and thus retain its strength.

Temperature/pressure combinations of 1300° C. and 240,000 psi and 100,000 psi at 1750° C. and higher achieved, and 2000° C./275,000 psi are also achieved with the present invention while die chamber 11 at 11A and 11B remains at about 500° C. or less.

Referring more specifically to FIGS. 1, 2 and 3:

Water cooled (electrically heated) die 11 for heating cooling and pressing. The design of such dies 11 is conventional and well covered in the literature. The demands placed on the die are not extreme due to the design of the encapsulation assembly. Since the encapsulation assembly is usually placed in the die at room temperature and is fully supported, there is no requirement for strength imposed on the assembly. Thus, the assembly is designed to provide maximum insulation between the filament 19 heat source and the die wall 11A. The die wall 11A (or 11B) is able to maintain a relatively low temperature at which common tool steels have sufficient strength, e.g. at or less than about 500° C.

Sliding piston. The basic requirement for the piston 12A (12B) is compressive strength. Since the piston 12A is well insulated, tool steel or various grades of tungsten carbide are used depending upon the operating pressure.

In piston 12B, the filament leads 19A and 19B and thermocouple leads 20 are passed to the external instrumentation. The instrumentation supplies electrical energy and monitors the temperature of the sample 18 prior to and during compaction, and thereafter unless the thermocouple 17 fails. FIG. 2 shows all of these leads are electrically insulated from piston 12B.

In a preferred embodiment the at least one temperature measuring device is encapsulated within the preglass material, especially within less than about 1 inch of the sample. This is true where the chamber of die 11 is about 1 inch in diameter. For larger chambers (2 to 6 inches in diameter or larger) the thermocouples may be placed at various locations to provide information about the temperature of the sample before, during and after pressing. For instance, leads for a second thermocouple might be passed through piston 12A similarly to the configuration shown in 12B.

Pyrophyllite disk 13. The disk 13 is a reasonably dense ceramic material with low thermal conductivity and good high temperature stability. The purpose of the disk is to keep the sliding piston 12A cool.

Pyrophyllite disk 14. This disk 14 is the same as disk 13 but with the added requirement of being a reasonably good electrical insulator at high temperatures. The filament leads 19A and 19B and thermocouple leads 20 pass through holes in the disk.

Powder insulator 15. Insulator 15 is a layer of lightly compacted powder, such as silica, magnesia or zirconia, that provides good high temperature insulation capability and is also easily deformed.

Encapsulation shell 16. This cylindrical shell 16 with one open end that serves as the container during the encapsulation phase and as deformable insulation during the pressing phase. It is composed of a low density refractory ceramic, e.g. $Al_2O_3$ with low compressive strength and good resistance to attack by the encapsulation glass. The two filament contacts and two thermocouple contacts pass through holes 16A, 16B, 16C and 16D respectively in the bottom of shell 16.

Sample 18. Sample 18 to be pressed is located in the center of assembly 10. Sample and filament shape are altered as required for any particular particle.

The filament. Filament 19 is usually composed of a refractory metal or alloy (e.g. tungsten, Nichrome) compatible with the fluid (glass) being used. The filament 19 is envisioned as a closed serpentine loop that surrounds the shape of a cylinder. The closed loop is thus composed of a series of adjacent open loops as shown. Contacts are made to the loop 180 degrees apart at the bottom of the cylinder. The contact wires 19A and 19B are of greater diameter than the filament in order to reduce their heating and to allow for mass loss due to oxidation since they are exposed to air. The contact wire 19A and 19B and filament 19 combination are a function of the system requirements. The opposed contacts 19A and 19B arrangement is of particular importance at high temperatures due to the significant loss of resistance in the glass.

Encapsulation glass 22. Glass (fluid) 22A, 22B, 22C is a key aspect of the invention. It serves as a pressure transmitting medium and as a barrier to contamination of the sample. It is a current widespread practice to use glass as a pressure transmitting medium, but the role of the glass with respect to glass/sample interaction and environment/glass interaction has been largely ignored. With respect to the present invention, the most important contribution of the glass is the protection of the filament. All refractory metals are subject to catastrophic oxidation in air at temperatures well below their melting points. By encapsulating the refractory metal filament (Ta, W, Mo, Nb, Re, etc.) in glass composed of stable oxides, the filament can be heated at temperatures close to the melting point of the metal. Since the filament is surrounded by a low viscosity fluid at high temperatures, mechanical stresses are minimized. The glass composition is tailored so that at high temperature, the glass resistance is low enough so that the glass encapsulation medium functions as an additional heating element. Glass 22B is shown as a hollow cylinder of glass. The filament 19 is placed within cylinder 22B. Usually when cylinder 22B melts, it covers the filament 19 and provides the desired protection of the filament 19 at higher temperatures. A second smaller cylinder 22B' may be placed within both cylinder 22B and within filament 19 to insure that during fusion filament 19 is encapsulated and protected from the atmosphere and from the sample 18. Glass 22A and 22C are placed in the assembly at ambient temperature as glass plugs and become fluid at elevated temperatures. After fusion and encapsulation 22A, 22B (22B') and 22C, are an integral fluid (glass) medium 22 surrounding sample 18 in which the heating element 19 and thermocouple 17 are also encapsulated.

It is also possible that 22B and 22B' have different glass compositions. For instance, high viscosity and non-penetrating glass is adjacent to the sample 18, while glass two has good fluid properties for the heating filament or for easy removal. The sample 18 also might be encapsulated by one thin layer of glass and then the heating element is encapsulated in the second type of glass.

Thermocouple 17. A temperature measuring (monitoring) device is shown as a thermocouple 17. It is understood that multiple temperature measuring devices can be used. Some may be outside the fused glass, but still in close proximity (less than 2 inches) to sample 18. Thermocouple 17 is selected on the basis of glass compatibility and operating temperature. The thermocouple placement allows accurate measurement of the process temperature and is part of the control process loop.

Superconductors—The present invention is useful to prepare dense (electrically) superconducting oxides as described by R. Dagnai in "Superconductivity: A Revolution in Electricity in Taking Shape," *Chemical and Engineering News*, May 11, 1987, pp. 7–16. Also see U.S. Pat. Nos.: M. Dietrich, et al., 4,581,289; W. G. Maranik, et al., 4,073,666; J. H. P. Watson, 3,748,728; and A. W. Sleight, 3,932,315. The YBaCuO oxides are preferred, especially $YBa_2Cu_3O_x$ where x is between 6.5 and 7. In some instances, portions or all of the Ba can be replaced with Sr. Also, some oxygen can be replaced with fluorine.

During the encapsulation step for the super-conducting-oxides, at up to 850° C., a partial pressure of oxygen is maintained in the sample so that the oxides do not change composition by loss of oxygen in the lattice structure. The oxide is then densified in the usual manner.

As is known in the art, proper cooling (or annealing) of the densified superconducting oxide is very important and usually occurs in an oxygen or air environment so that oxygen is not lost from the lattice structure.

The following Examples are presented to be illustrative and explanatory only. They are not to be construed to be limiting in any way.

The chemicals and materials used in the present invention are either commercially available from chemical suppliers, or are produced from literature sources. Chemical suppliers are tabulated in *Chemical Sources, U.S.A.*, which is published annually by Directories Publications, Inc., Boca Ratan, Fla. Chemical and material suppliers include, for example: Fisher Scientific, Inc., of 2170 Martin Avenue, Santa Clara, Calif. 95050; Aldrich Chemical Company, Milwaukee, Wis.; Baker Chemical Co., Flemington, N.J.; and others cited herein.

EXAMPLE 1

PARAMETERS FOR ENCAPSULATION AND COMPACTION (a) Zirconium oxide: An assembly to be encapsulated comprising an alumina shell, borosilicate glass preform, tungsten filament having molybdenum or tantalum leads, a commercial Pt/Pt13Rh thermocouple (Type R) from Omega Industries of Stamford, Connecticut, and the $ZrO_2$ sample are fixtured and placed in a vacuum furnace.

After pumping to a pressure of 50 microns, the assembly is heated to a temperature of 450° C. at a rate of 5 degrees per minute. After a dwell of 1 hour at 450° C., the assembly is heated to 850° C. at a rate of 5 degrees per minute and held for 30 minutes. An external pressure of about 1 psi is applied to the top of the assembly to assist glass flow during this phase. The external furnace is then turned off and the assembly allowed to cool to room temperature over a period of about 4 hours.

The compaction of the sample is carried out by placing the encapsulated sample in the pressure chamber (FIG. 2) and connecting the thermocouple and filament leads to a power supply. The assembly is heated at a rate of 10° C./minute to a temperature of 450° C. and then at a rate of 20° C./minute to the final compaction temperature of 1300 degrees, and is held for 15 minutes. After fifteen minutes, a pressure of 230,000 psi is applied for a period of ten seconds. The sample is then ejected from the chamber and placed in a furnace at about 800° C. for controlled cooling, typically at between about 5 to 10 degrees per minute.

(b) Zinc Sulfide: The encapsulation using borosilicate glass and compaction of zinc sulfide (ZnS) is identical to that for zirconium oxide, of subpart (a) above, except that the encapsulation and compaction temperatures are 800° C. and 900° C. respectively. Due to the lower process temperatures, a NICHROME heating element with nickel leads and a type K thermocouple are substituted for those of subpart (a).

(c) Silicon Nitride: For silicon nitride, a zirconia shell, a W5Re/W26Re thermocouple and tungsten heating element with molybdenum leads is used. The $Si_2N_4$ sample is encapsulated in the same fashion as the zirconium oxide, in subpart (a) above.

For compaction, the sample is heated at a rate of 10° C./minute to 450° C. then at a rate of 25° C./ minute to 1750° C. and a pressure of 100,000 psi is immediately applied for a period of ten seconds. After ejection, the sample is cooled in the same fashion as for zirconium oxide. For encapsulation, high silica glass (VYCOR) or Quartz glass is also substituted for borosilicate glass of Kimble Glass. The densified article is slowly cooled over 20 hr from 850° to 400° C.

(d) Silicon Carbide: Subpart (a) is repeated except that the zirconium oxide is replaced with an equivalent amount of weight of silicon carbide. Compacted silicon carbide is obtained.

Other materials include: boron carbide, aluminum oxide, boron nitride, zinc selenide, etc.

EXAMPLE 2

ENCAPSULATION AND COMPACTION FOR SUPERCONDUCTING OXIDES (a) Example 1 is repeated except that zirconium oxide is replaced with $YBa_2Cu_3O_7$. After pumping down the oxides at ambient temperature to a pressure of 50 microns, oxygen is added to obtain a partial pressure of oxygen of 1,000 microns. The assembly is heated slowly (5° c/min.) to 800° C. except that the partial pressure of oxygen is maintained up to and during the encapsulation. The densified product is obtained by heating at 850° C. and pressing at 250,000 psi for about 10 seconds. The densified article is slowly cooled over 20 hr in an oxygen environment from 850° to 400° C. This annealing is to insure that oxygen atoms are not lost from the crystal structure.

The densified material has superconducting properties for electricity at temperatures between about 5° and 273° Kelvin (K), preferably between about 77° and 273° K.

While only a few embodiments of the invention have been shown and described herein, it will become apparent to those skilled in the art that various modifications and changes can be made in the present invention to densify encapsulated material at high pressure using localized heating at the sample site using a heating element imbedded within the encapsulated material without departing from the spirit and scope of the present invention. All such modification and changes coming within the scope of the appended claims are intended to be carried out thereby.

I claim:

1. A method for consolidating or densifying material sample selected from metal, ceramic or mixtures thereof to form a densified compact article, which process comprises:
   (a) arranging the material sample to be consolidated or densified in a general configuration completely surrounded by a pre-glass material which forms a fluid glass at elevated temperature in close proximity and surrounded about at least one diameter, by an electrical heating element means within the pre-glass material and having at lest one temperature measuring device in close proximity to the material sample producing an arrangement all within a shell, wherein said arrangement and shell are in a pressure chamber apparatus having external heating and cooling means and vacuum means;

(b) externally heating the arrangement and shell produced in step (a) at a temperature of between about 200° and 850° C. at a reduced pressure of between about 1 and 0.0001 mm of mercury for a time effective to remove volatiles, and to produce a dried material sample;

(c) heating the dried material sample produced in step (b) to produce fusion of the pre-glass at between about 500° C. to 1600° C. and encapsulation of the sample and encapsulation of the electrical heating element means, and optionally encapsulating the at least one temperature measuring device to produce an encapsulated prearticle having local encapsulated electrical heating element means;

(d) heating the encapsulated prearticle produced in step (c) in the external pressure chamber apparatus, using the encapsulated heating element means, to locally heat the encapsulated prearticle and sample to a temperature of between about 700° C. and 2,200° C., monitoring the sample temperature using the at least one temperature measuring device, and simultaneously applying a pressure to the encapsulated prearticle of between about 50,000 and 275,000 psi for a time effective to densify the dried material sample, wherein the external pressure chamber has a surface temperature in contact with the encapsulated prearticle of not greater than about 500° C.; and (e) releasing the elevated pressure and decreasing the temperature of the formed densified compact article to a predetermined temperature.

2. The method of claim 1 wherein the at least one temperature measuring device of step (c) is encapsulated within the fused glass.

3. The method of claim 1 wherein in step (c) the assembly has multiple temperature measuring devices, both encapsulated and non-encapsulated.

4. The method of claim 1 wherein in step (d) the pressure is produced using a solid piston.

5. The method of claim 1 wherein in step (d) the pressure and a portion up to 100% of the temperature are produced using explosive compaction.

6. The method of claim 1 wherein in step (d) the encapsulated prearticle is at a temperature of between about 500° and 800° C. when it is placed in the external pressure chamber.

7. The method of claim 1 wherein the process further includes between steps (c) and (d):
step (c$^1$) cooling the encapsulated prearticle to an intermediate temperature between about ambient and 500° C.

8. The method of claim 1, the use of glass of specific composition to prevent contamination of the sample to be densified or degration and to prevent failure of the heating element means.

9. The method of claim 1 wherein the heating element means is a metallic filament.

10. The method of claim 1 wherein the temperature measuring device is a thermocouple.

11. The method of claim 1 wherein the glass is selected from borosilicate glass, quartz glass or high silica glass.

12. The method of claim 1 which further includes between steps (b) and step (c):
step (b$^1$) contacting of the arrangement of step (b) with a predetermined partial pressure of a gas to produce oxides of the elements and compounds present prior to and during fusion.

13. The method of claim 12 wherein the gas is selected from oxygen, fluorine or mixtures thereof.

14. The method of claim 12 wherein the gas is oxygen.

* * * * *